(12) United States Patent
Lin

(10) Patent No.: US 11,847,294 B2
(45) Date of Patent: Dec. 19, 2023

(54) METHOD FOR GENERATING DESKTOP OF MOBILE TERMINAL, DEVICE AND ELECTRONIC DEVICE

(71) Applicant: GREE ELECTRIC APPLIANCES, INC. OF ZHUHAI, Zhuhai (CN)

(72) Inventor: Xiaoyan Lin, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/406,202

(22) Filed: Aug. 19, 2021

(65) Prior Publication Data

US 2022/0129117 A1 Apr. 28, 2022

Related U.S. Application Data

(63) Continuation of application No. PCT/CN2021/089608, filed on Apr. 25, 2021.

(30) Foreign Application Priority Data

Oct. 22, 2020 (CN) .......................... 202011142001.1

(51) Int. Cl.
*G06F 3/0481* (2022.01)
*H04M 1/72469* (2021.01)
(Continued)

(52) U.S. Cl.
CPC .......... *G06F 3/0481* (2013.01); *G06F 3/0486* (2013.01); *G06F 3/04817* (2013.01); *H04M 1/724* (2021.01); *H04M 1/72469* (2021.01)

(58) Field of Classification Search
CPC ............... G06F 3/0482; G06F 3/04817; G06F 3/04845; G06F 3/0484; G06F 3/04847;
(Continued)

(56) References Cited

U.S. PATENT DOCUMENTS 5,754,178 A * 5/1998 Johnston, Jr. ......... G06F 3/0486
715/769
9,857,940 B2 * 1/2018 Park ..................... G06F 3/0486
(Continued)

FOREIGN PATENT DOCUMENTS

CN 103616980 A 3/2014
CN 104834430 A 8/2015
(Continued)

OTHER PUBLICATIONS

First Office Action in Corresponding Chinese Application No. 202011142001.1, dated Aug. 27, 2021; 25 pgs.
(Continued)

*Primary Examiner* — Nicholas Ulrich
(74) *Attorney, Agent, or Firm* — HAUPTMAN HAM, LLP

(57) ABSTRACT

Disclosed is a method, a device and an electronic device for generating a desktop of a mobile terminal. Wherein, the method comprising: responding to a first control instruction, and generating a floating window, wherein the floating window is positioned at a first display level, the floating window is used for previewing the layout of the target application icons; responding to a second control instruction, moving at least one application icon of at least one desktop from an initial display position to a target display position on the floating window, wherein the at least one desktop is positioned at a second display level; and responding to a third control instruction, and generating a target desktop according to the target application icon layout.

28 Claims, 18 Drawing Sheets

(51) Int. Cl.
*G06F 3/0486* (2013.01)
*G06F 3/04817* (2022.01)
*H04M 1/724* (2021.01)

(58) Field of Classification Search
CPC .... G06F 3/0483; G06F 3/048; G06F 3/04886; G06F 3/0486; G06F 40/106; G06F 40/103; G06F 2203/04803; G06F 3/0481; G06F 2203/04804; H04M 1/72469; H04M 1/72472; H04M 1/724
See application file for complete search history.

(56) References Cited

U.S. PATENT DOCUMENTS

| | | | | |
|---|---|---|---|---|
| 10,691,291 | B2* | 6/2020 | Bae | G06F 3/04817 |
| 2004/0090467 | A1* | 5/2004 | Bonura | G06F 3/167 |
| | | | | 715/790 |
| 2008/0195969 | A1* | 8/2008 | Brown | G06F 3/04847 |
| | | | | 715/802 |
| 2013/0139109 | A1* | 5/2013 | Kim | G06F 3/04883 |
| | | | | 715/835 |
| 2014/0040826 | A1* | 2/2014 | Wei | G06F 3/0488 |
| | | | | 715/810 |
| 2016/0202887 | A1* | 7/2016 | Liu | G06F 3/04842 |
| | | | | 715/763 |
| 2019/0114921 | A1* | 4/2019 | Cazzoli | G06V 20/58 |
| 2020/0333944 | A1* | 10/2020 | Guo | G06F 3/04842 |

FOREIGN PATENT DOCUMENTS

| | | |
|---|---|---|
| CN | 105139851 A | 12/2015 |
| CN | 103034396 B | 1/2016 |
| CN | 105975142 A | 9/2016 |
| CN | 106873842 A | 6/2017 |
| CN | 107438825 A | 12/2017 |
| CN | 108052249 A | 5/2018 |
| CN | 111158540 A | 5/2020 |
| CN | 112214144 A | 1/2021 |
| WO | WO-2021115373 A1 * | 6/2021 |

OTHER PUBLICATIONS

International Search Report in Corresponding International Application No. PCT/CN2021/089608, dated Jul. 30, 2021; 2 pgs.
Search Report in Corresponding Chinese Application No. 202011142001.1, dated Aug. 20, 2021; 6 pgs.
Written Opinion in Corresponding International Application No. PCT/CN2021/089608, dated Jul. 30, 2021; 7 pgs.

* cited by examiner

METHOD FOR GENERATING DESKTOP OF MOBILE TERMINAL, DEVICE AND ELECTRONIC DEVICE

CROSS-REFERENCE TO RELATED APPLICATIONS

This application is a continuation of International Application No. PCT/CN2021/089608, filed on Apr. 25, 2021, which claims priority to Chinese Patent Application No. 202011142001.1, filed on Oct. 22, 2020. Both of the aforementioned applications are hereby incorporated by reference in their entireties.

TECHNICAL FIELD

The disclosure relates to the field of terminal control, in particular to a method, a device and an electronic device for generating a mobile terminal desktop.

BACKGROUND

In a process of managing the application of the mobile desktop, an operation of re-arranging a desktop application is mostly to perform custom arrangement on the desktop application by means of dragging application icons, for example, an application icon is dragged to a specific position of the desktop, and the application behind the application icon moves backwards along the position.

The above re-arranging is easily implemented by mistake. In addition, in the above re-arranging only a single application/folder can be subjected to layout position adjustment. If a plurality of desktop applications are to be laid out, and if the desktop span of application icons is large, a user take a long time to perform the re-arranging, and the operation burden is heavy on the user.

SUMMARY

According to at least one aspect of the embodiments of the present disclosure, there is provided a method for generating a desktop of a mobile terminal, including: responding to a first control instruction, and generating a floating window, wherein the floating window is positioned at a first display level and is used for previewing the layout of the target application icons. The method further includes responding to a second control instruction, and moving at least one application icon of at least one desktop from an initial display position to a target display position on the floating window. The at least one desktop is positioned at a second display level. The method further includes responding to a third control instruction, and generating a target desktop according to the target application icon layout.

According to at least one aspect of the embodiments of the present disclosure, there is also provided a method for generating a desktop of a mobile terminal, including: responding to a first control instruction, and generating a floating window, wherein the floating window is positioned at a first display level and is used for displaying the layout of application icons of at least one desktop on the mobile terminal. The method further includes responding to a second control instruction, and moving at least one application icon of the at least one desktop from an initial display position in the floating window to a target display position of the desktop displayed on the mobile terminal, wherein the desktop displayed on the mobile terminal is positioned at a second display level. The method further includes responding to a third control instruction, and generating a target desktop according to the application icon layout of the desktop displayed on the mobile terminal.

According to at least one aspect of the embodiments of the present disclosure, there is also provided a device for generating a desktop of a mobile terminal, comprising: a first generation module usable for responding to a first control instruction and generating a floating window. The floating window is positioned at a first display level, and the floating window is usable for previewing the layout of target application icons. The device further includes a processing module, configured to respond to a second control instruction, move at least one application icon of at least one desktop from an initial display position to a target display position on the floating window, where the at least one desktop is at a second display level, and the first display level is higher than the second display level. The device further includes the second generation module usable for responding to a third control instruction and generating a target desktop according to the target application icon layout.

According to at least one aspect of the embodiments of the present disclosure, there is also provided a device for generating a desktop of a mobile terminal, comprising: a first generating unit usable for responding to a first control instruction and generating a floating window. The floating window is positioned at a first display level and is usable for displaying the layout of application icons of at least one desktop on the mobile terminal. The device further includes the processing unit usable for responding to a second control instruction, and moving at least one application icon of the at least one desktop from an initial display position in the floating window to a target display position of the desktop displayed on the mobile terminal, wherein the desktop displayed on the mobile terminal is positioned at a second display level. The device further includes the second generating unit usable for responding to a third control instruction and generating a target desktop according to the application icon layout of the desktop displayed on the mobile terminal.

According to at least one aspect of the embodiments of the present disclosure, there is also provided a non-volatile storage medium, in which a computer program is stored, where the computer program is configured to execute any one of the above methods for generating a desktop of a mobile terminal when running.

According to at least one aspect of the embodiments of the present disclosure, there is also provided a processor, configured to execute a program, where the program is configured to execute any one of the above methods for generating a desktop of a mobile terminal when running.

DETAILED DESCRIPTION OF THE EMBODIMENTS

Figure 1:
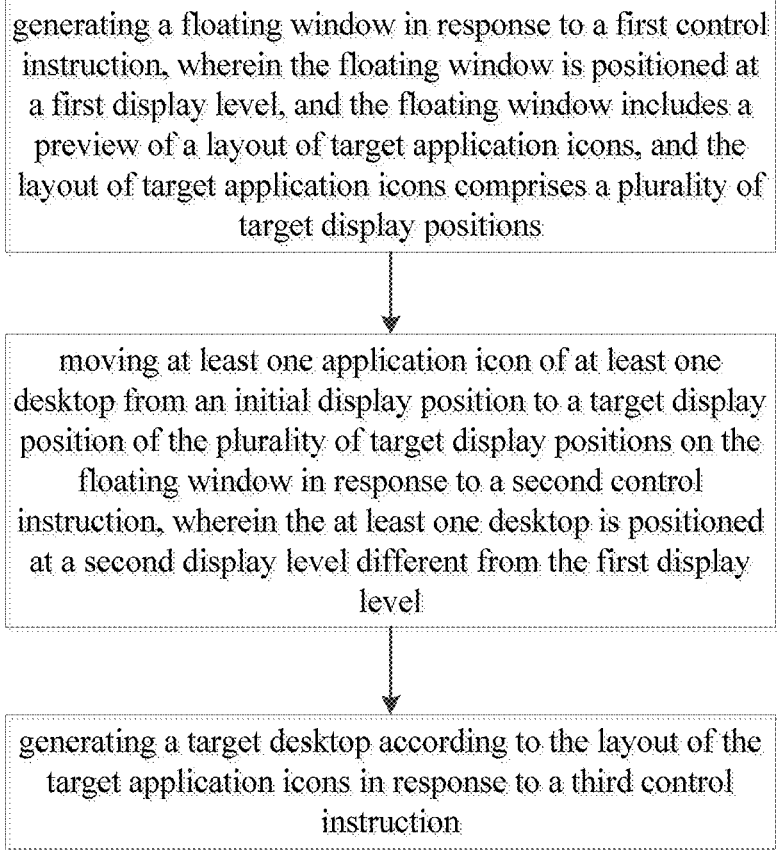
FIG. 1 is a flowchart of a method of generating a desktop of a mobile terminal according to some embodiments of the present disclosure.

In order to make the technical solutions of the present disclosure better understood, the technical solutions in the embodiments of the present disclosure will be clearly and completely described below with reference to the drawings in the embodiments of the present disclosure, and it is obvious that the described embodiments are only a part of the embodiments of the present disclosure, and not all of the embodiments. All other embodiments, which can be derived by a person skilled in the art from the embodiments given herein without making any creative effort, shall fall within the protection scope of the present disclosure.

The terms "first" "second" and the like in the description and claims of the present disclosure and in the drawings described above are used for distinguishing between similar elements and not necessarily for describing a particular sequential or chronological order. One of ordinary skill in the art would understand that the data so used is interchangeable under appropriate circumstances such that some embodiments of the disclosure described herein are capable of operation in sequences other than those illustrated or described herein. Furthermore, the terms "comprises" and "having," and any variations thereof, are intended to cover a non-exclusive inclusion, such that a process, method, system, article, or device that comprises a list of steps or elements is not necessarily limited to those steps or elements expressly listed, but may include other steps or elements not expressly listed or inherent to such process, method, article, or device.

According to at least one aspect of the embodiments of the present disclosure, there is also provided an electronic device, including a memory and a processor, where the memory stores a computer program, and the processor is configured to execute the computer program to perform any one of the above methods for generating a desktop of a mobile terminal.

In accordance with some embodiments of the present disclosure, there is provided at least one embodiment of a method for generating a desktop for a mobile terminal, one of ordinary skill in the art would understand that the steps illustrated in the flowchart of the accompanying drawings may be performed in a computer system such as a set of computer-executable instructions, and that while a logical order is illustrated in the flowchart, in some cases the steps illustrated or described may be performed in an order different than here.

FIG. 1 is a flowchart of a method for generating a desktop of a mobile terminal according to some embodiments of the present disclosure, as shown in FIG. 1, the method includes step S102 to S106.

In step S102, responding to a first control instruction, and generating a floating window, wherein the floating window is positioned at a first display level and is used for previewing the layout of the target application icons.

In step S104, responding to a second control instruction, and moving at least one application icon of at least one desktop from an initial display position to a target display position on the floating window, wherein the at least one desktop is positioned at a second display level.

In step S106, responding to a third control instruction, and generating a target desktop according to the target application icon layout.

In some embodiments of the disclosure, a floating window is generated by responding to a first control instruction, wherein the floating window is positioned at a first display level and is used for previewing the layout of the target application icons; responding to a second control instruction, and moving at least one application icon of at least one desktop from an initial display position to a target display position on the floating window, wherein the at least one desktop is positioned at a second display level; responding to the third control instruction, generating the target desktop according to the target application icon layout. These steps help to achieve the purpose of improving the processing efficiency and accuracy of generating the mobile terminal desktop, so that the technical effect of quickly and conveniently customizing the application icons in the layout desktop is achieved, and the technical problem that the processing efficiency and accuracy are low when the mobile terminal desktop is generated is solved or reduced.

Optionally, in some embodiments, the mobile terminal may be a terminal device such as a smart phone, an iPAD, a smart watch, and the like, and the display screen of the mobile terminal is a touch display screen. The floating window is positioned at a first display level, the at least one desktop is positioned at a second display level, and the first display level is higher than the second display level. The floating window is a window control for previewing the layout of the target application icons, is a preview window of the updated target desktop, and can generate the target desktop according to the layout of the previewed target application icons in the floating window.

In some embodiments of the present disclosure, by providing a method for generating a desktop of a mobile terminal, a new operation mode can be provided for a user when performing custom layout arrangement on at least one application icon in the desktop of the mobile terminal. When a user desires to perform layout rearrangement on at least one application icon of at least one desktop, a first control instruction is generated when the operation that the user clicks or touches a touch display screen of the mobile terminal is detected. A floating window for previewing the layout of the target application icon appears in the desktop of the mobile terminal, the at least one application icon of the at least one desktop is moved from an initial display position to a target display position on the floating window in response to a second control instruction. A third control instruction is received, and a target desktop is generated according to the layout of the target application icon.

Through embodiments of the present disclosure, the user can fast and conveniently carry out the custom layout on the application icons in the desktop, when the application icons in the desktop need to cross a plurality of desktops for layout arrangement, some embodiments of the application can also easily realize the custom layout on the application icons in the desktop, so that the user can reduce the learning cost and the operation burden when carrying out the desktop application arrangement, and the purpose of fast and conveniently carrying out the custom layout arrangement on the application icons in the desktop is achieved.

Figure 2A:
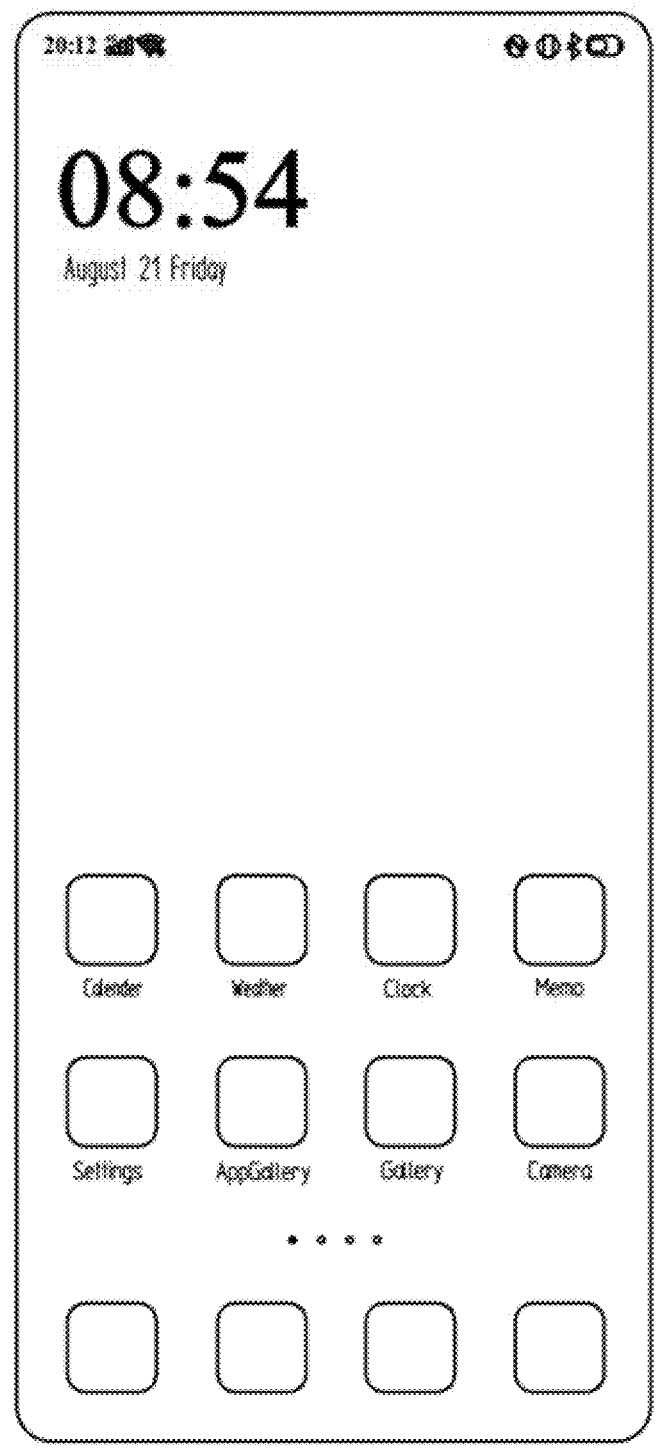
FIG. 2a is a schematic diagram of a desktop layout without application icon organization according to some embodiments of the present disclosure.
Figure 2B:
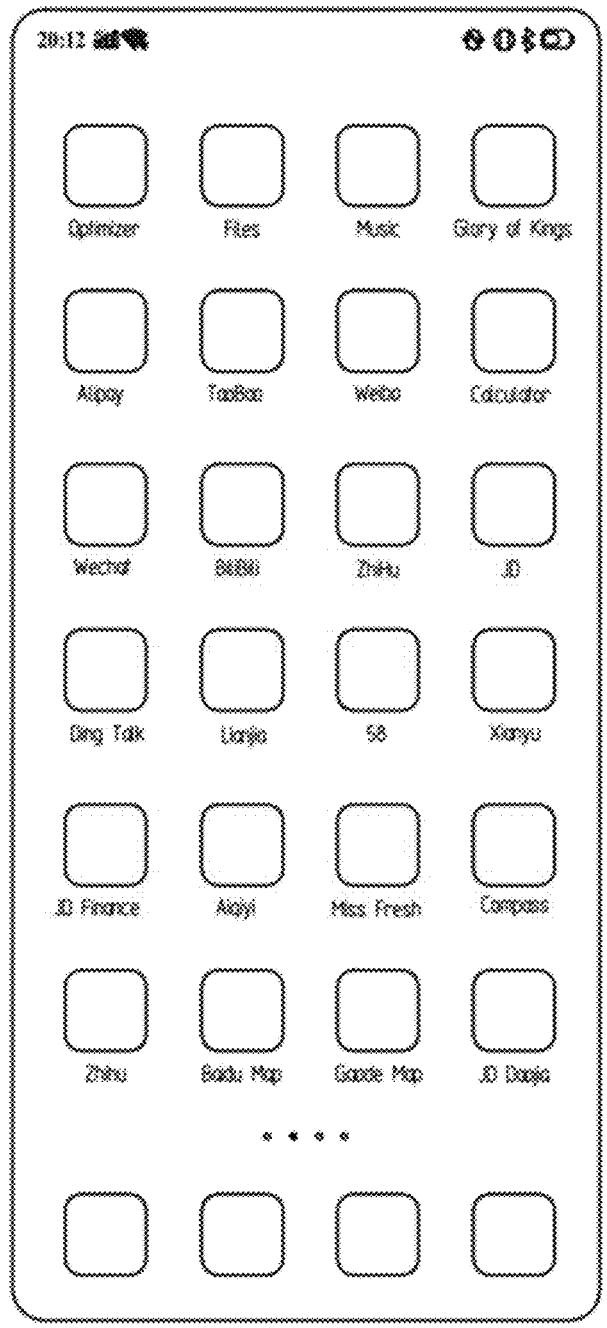
FIG. 2b is a diagram of a desktop layout without application icon reorganization according to some embodiments of the present disclosure.
Figure 2C:
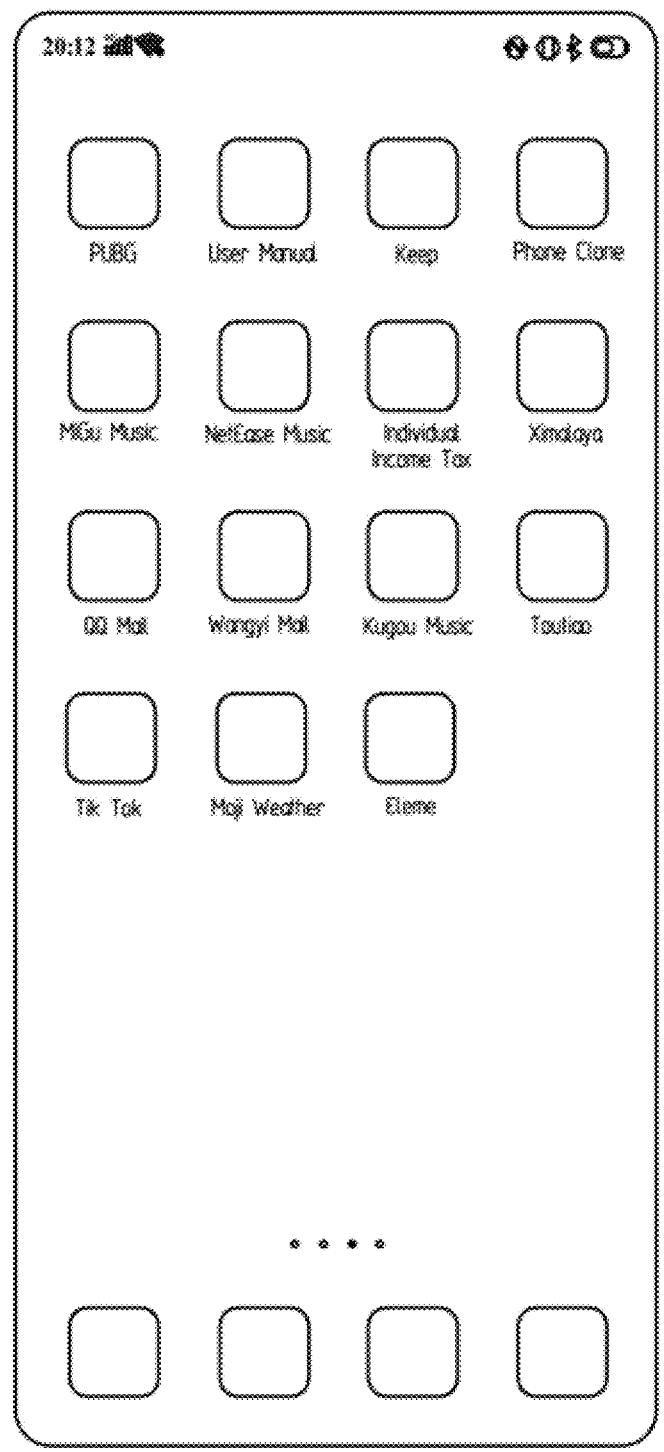
FIG. 2c is a diagram of a desktop layout without application icon reorganization according to some embodiments of the present disclosure.

In some embodiments, the schematic layout of the desktop when the application icon is not sorted is shown in FIG. 2a, FIG. 2b, and FIG. 2c, for example, FIG. 2a may be a current desktop, FIG. 2b is a desktop slid from the current desktop to the left, and FIG. 2c is a desktop slid from the current desktop to the right.

Figure 3:
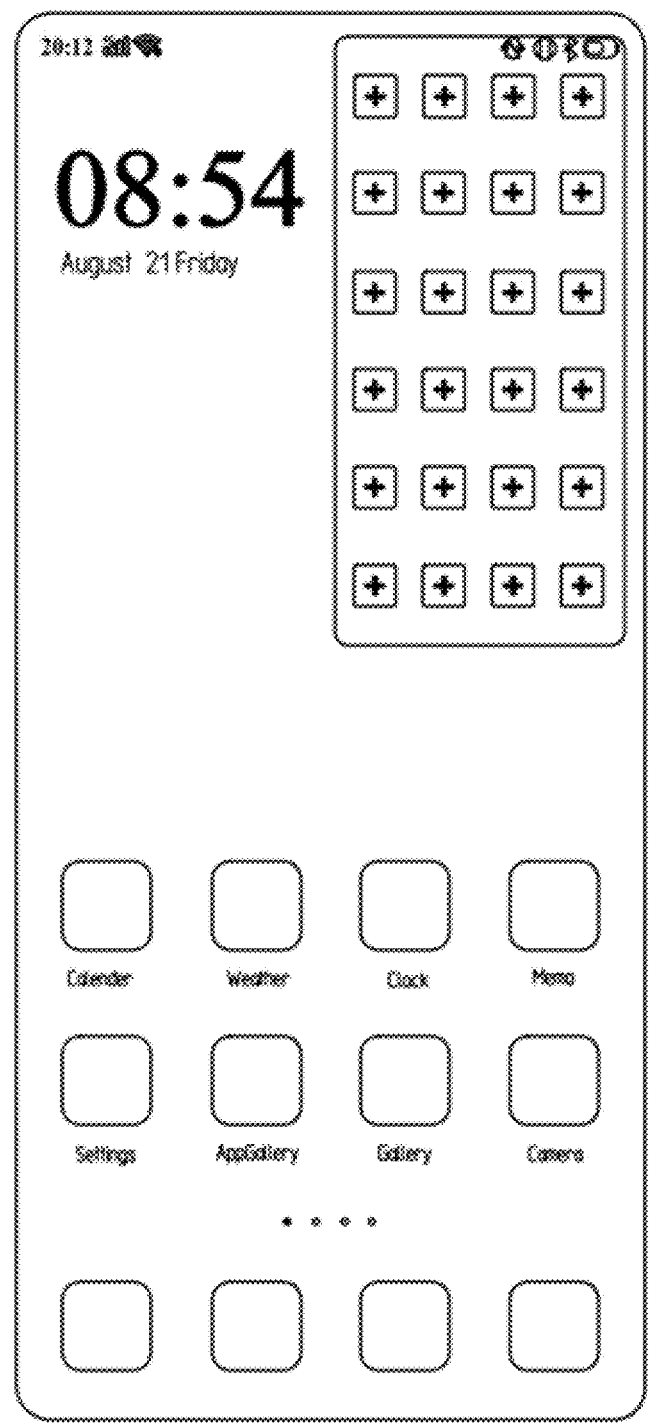
FIG. 3 is a schematic view of a floating window in accordance with some embodiments of the present disclosure.

As shown in FIG. 3, a first control instruction is generated according to a touch operation of a user clicking and dragging one or more application icons, the one or more application icons are laid out, and a floating window (preview floating window) appears on an upper layer of a desktop main interface, for example, the floating window is generated at an upper right corner of the desktop by default in some embodiments.

In some embodiments, the second control instruction is generated according to the operation that the user moves the at least one application icon from the initial display position to the target display position. In some embodiments, the third control instruction is generated according to the operation that the user ceasing contact, e.g., removing a finger, with the touch display screen after moving the at least one application icon from the initial display position to the target display position is detected.

In some embodiments, a default layout manner of the target display position on the floating window is the same as a layout manner of any desktop in the at least one desktop, and a display size of the floating window is scaled down in an equal proportion to a display size of any desktop in the at least one desktop. The layout manner describes an arrangement of icons on the touch display screen.

In some embodiments, a default layout manner of the target display position on the floating window is the same as a layout manner of any desktop in a plurality of candidate desktops preset in the mobile terminal, and a display size of the floating window is scaled down in an equal proportion to a display size of any desktop in the plurality of candidate desktops.

In some embodiments, the default layout manner of the target display position on the floating window is the same as the layout manner of the user-defined desktop, and the display size of the floating window is scaled down in equal proportion to the display size of the user-defined desktop.

For example, the display size of the floating window is scaled down according to the display size of any desktop in the at least one desktop, which may be scaled down to about ⅓, and the default layout manner of the target display positions on the floating window is the same as the current layout manner of the initial display positions on each desktop in the at least one desktop, that is, the target display positions are laid out in the floating window according to the current layout manner of the initial display positions on each desktop. For example, if the current layout manner of the initial display positions on each desktop is 4×*5, the default layout manner of the target display positions on the floating window may also be 4×*5.

In embodiments, moving at least one application icon of the at least one desktop from the initial display position to the target display position on the floating window includes: moving a plurality of application icons currently displayed on the same desktop from the initial display position to a target display position on the floating window.

Figure 4A:
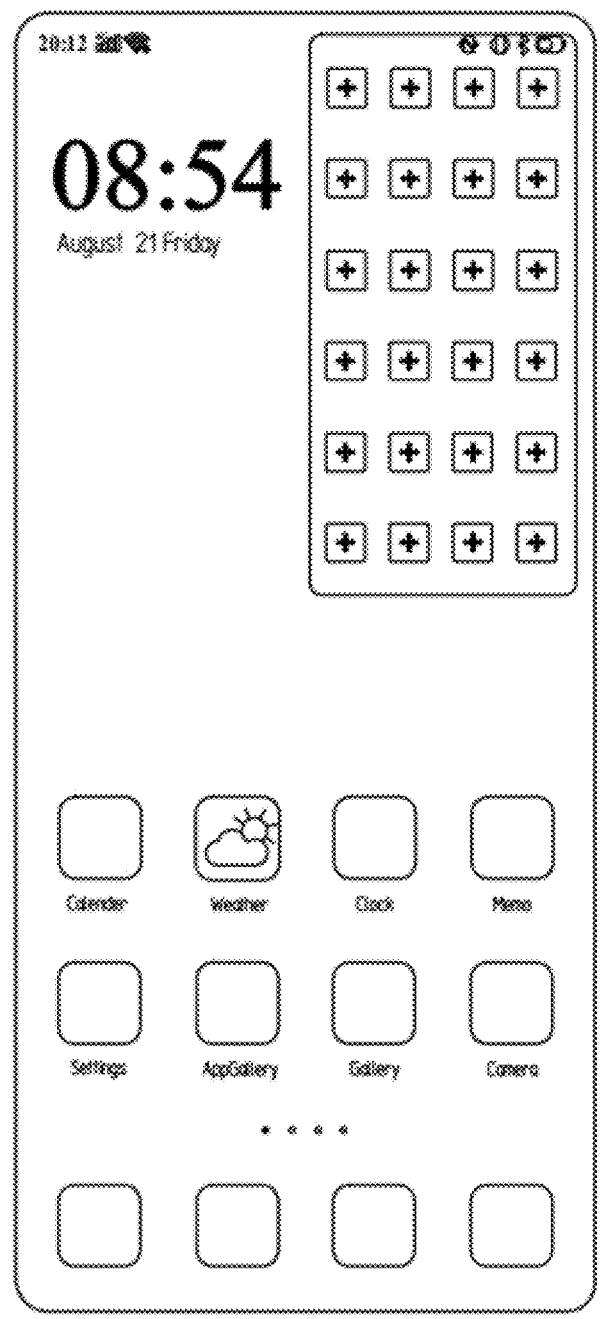
FIG. 4a is a schematic view of a scene that an application icon to be arranged on the same desktop is dragged to a floating window according to some embodiments of the present disclosure.
Figure 4B:
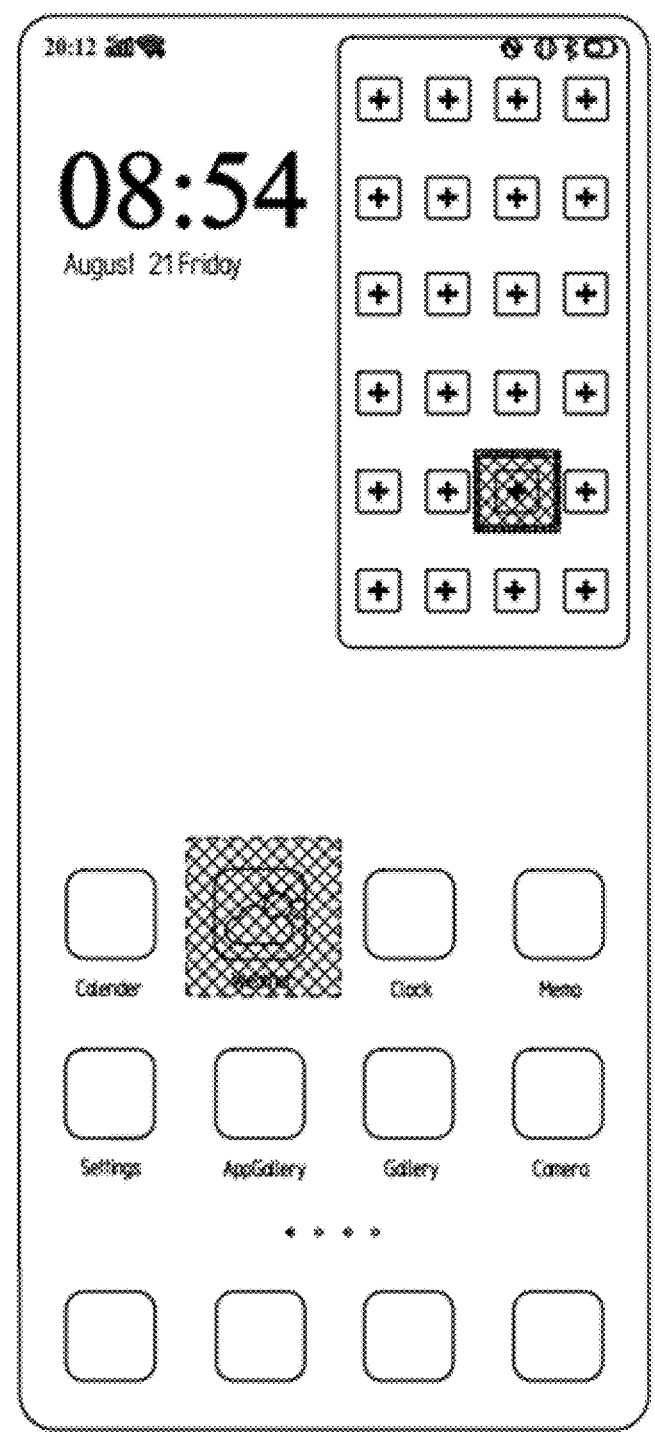
FIG. 4b is a schematic view of a scene for dragging an application icon to be sorted on the same desktop to a floating window according to some embodiments of the present disclosure.
Figure 4C:
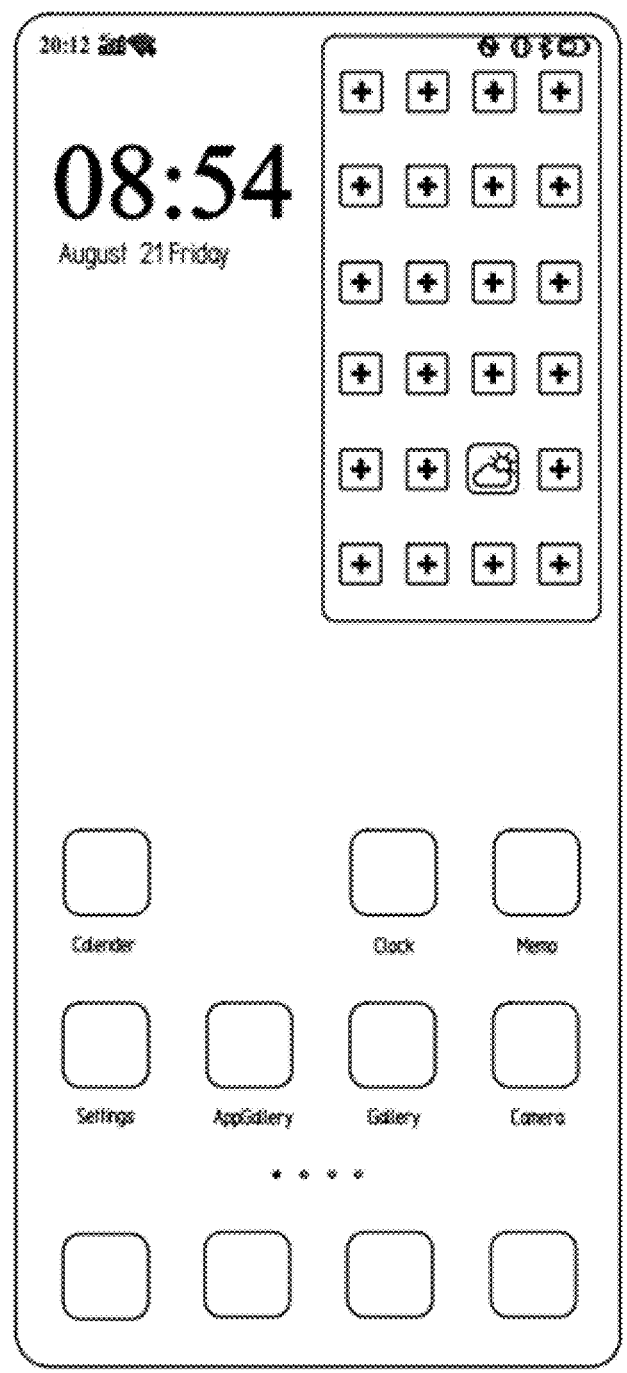
FIG. 4c is a schematic view of a scenario in which an application icon to be sorted on the same desktop is dragged to a floating window according to some embodiments of the present disclosure.

As shown in FIGS. 4a, 4b, and 4c, a scene schematic diagram of a mobile terminal desktop is continuously generated, so that a user can move a plurality of application icons currently displayed on the same desktop from the initial display position to a target display position on the floating window according to a personal desktop layout design, that is, the user drags an application icon to be sorted on the same desktop to the target display position on the floating window, and a target desktop is formed after the dragging is completed.

In some embodiments, moving at least one application icon of the at least one desktop from the initial display position to a target display position on the floating window includes: moving at least one application icon currently displayed on each of the plurality of desktops from the initial display position to a target display position on the floating window.

Figure 5A:
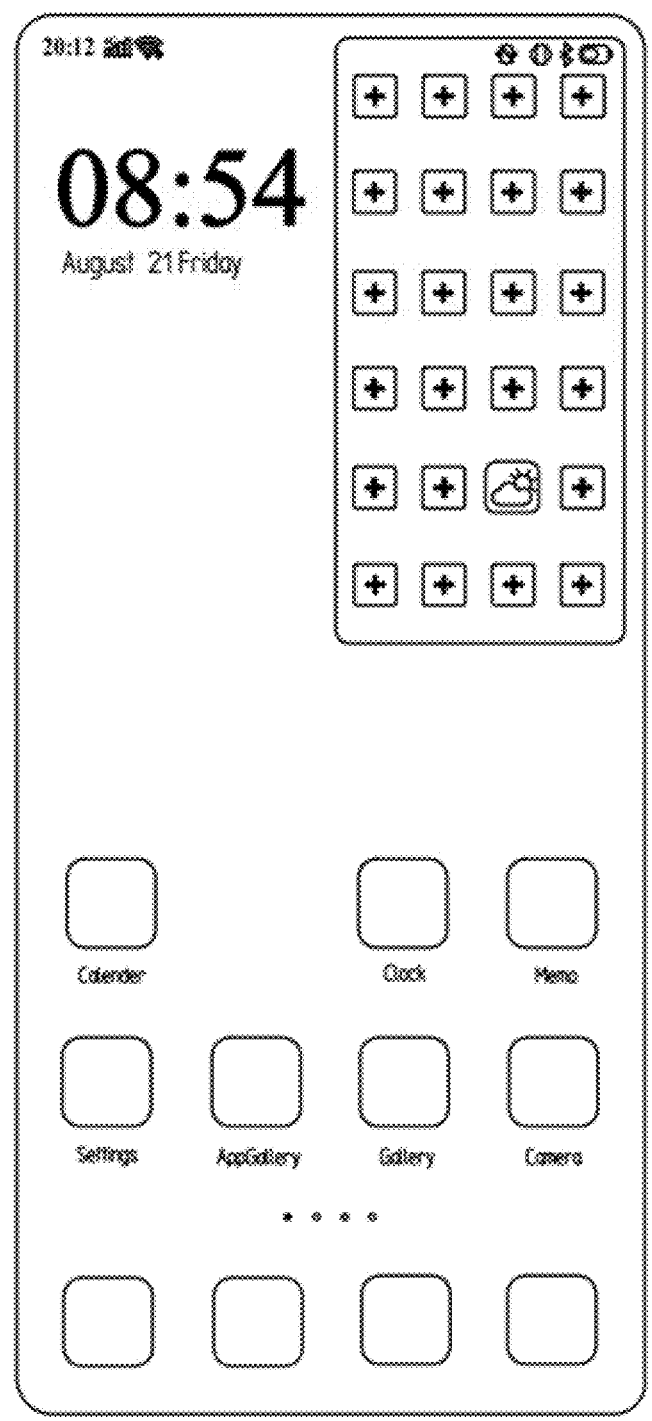
FIG. 5a is a schematic diagram of a scenario in which an application icon is dragged across desktops to a floating window according to some embodiments of the present disclosure.
Figure 5B:
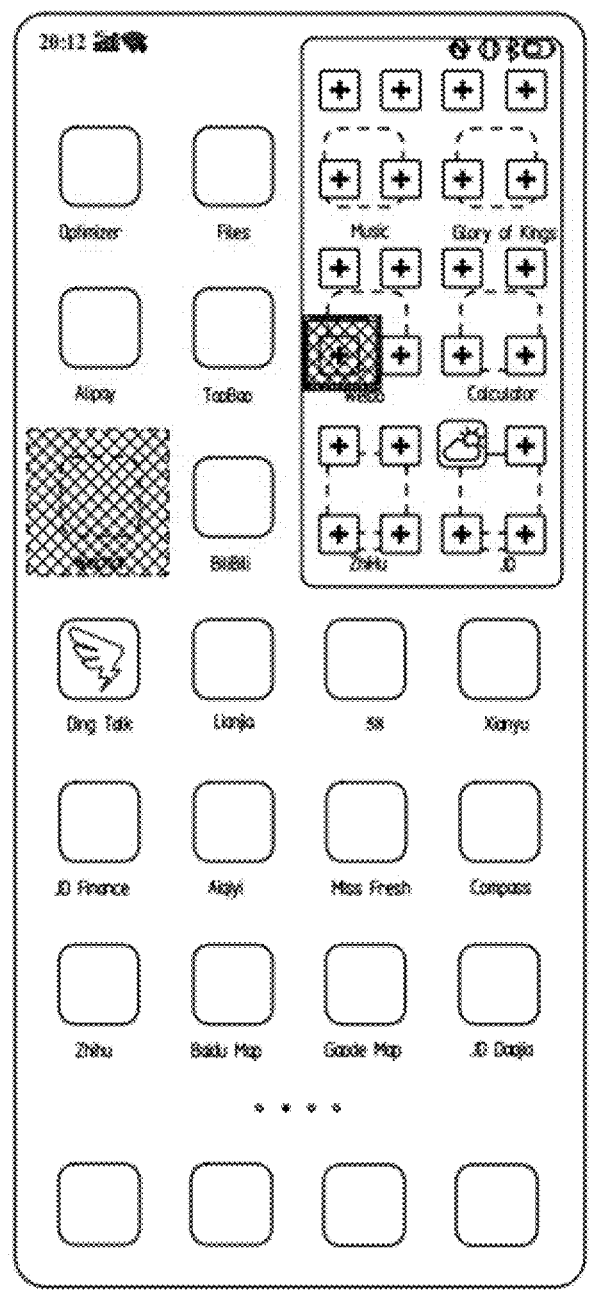
FIG. 5b is a schematic diagram of a scenario for dragging an application icon across a desktop to a floating window according to some embodiments of the present disclosure.
Figure 5C:
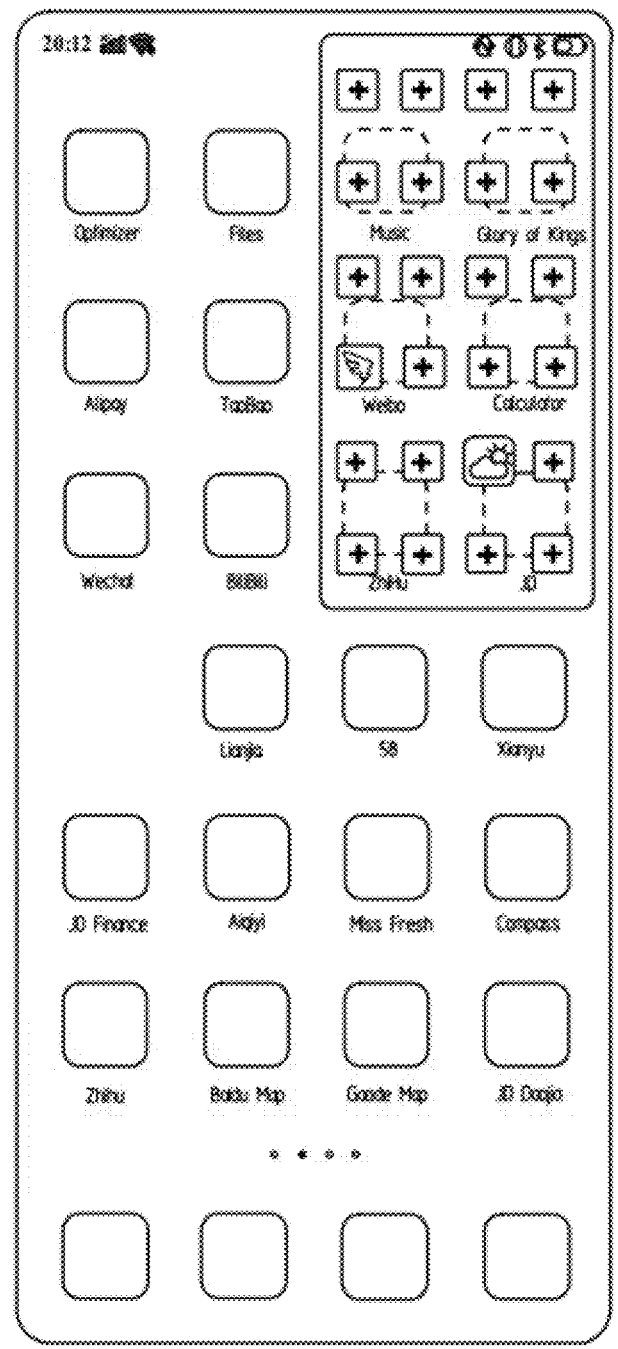
FIG. 5c is a schematic diagram of a scenario for dragging an application icon across a desktop to a floating window according to some embodiments of the present disclosure.

As shown in FIGS. 5a, 5b, and 5c, in a case where there are many application icons and a plurality of application icons is displayed in a plurality of desktops, at least one application icon currently displayed on each of the plurality of desktops may be moved from the initial display position to a target display position on the floating window based on a detected second control instruction of the user according to some embodiments of the present application.

One of ordinary skill in the art would understand that when at least one application icon currently displayed on each desktop is positioned below the floating window, the occluded application icon presents an icon in a dashed box format as shown in FIGS. 5b and 5c, rather than being directly hidden and not displayed by the floating window, so that when a user moves the at least one application icon currently displayed on the desktop from an initial display position to a target display position on the floating window, the name of each application icon and application icon can still be visually seen through the floating window, and the application icon hidden by the floating window is viewable without moving the floating window back and forth.

One of ordinary skill in the art would understand that in other subsequent schematic diagrams respectively displaying multiple application icons in multiple desktops, for example, FIGS. 6b, 6c, 7b, and 7c, when at least one application icon currently displayed on each desktop is positioned below the floating window, the occluded application icon also appears as an icon in a dashed box format.

In some embodiments of the disclosure, different desktops can be switched to finish the operation of moving the application icons, and when a large number of application programs are downloaded in the mobile terminal, a user can drag the application icons to the floating window across the desktops to finish the layout arrangement of the application icons.

In some embodiments, the method further includes: in response to a fourth control instruction, switching among the plurality of desktops, and keeping the display position and the display hierarchy of the floating window in the touch display screen unchanged.

Figure 6A:
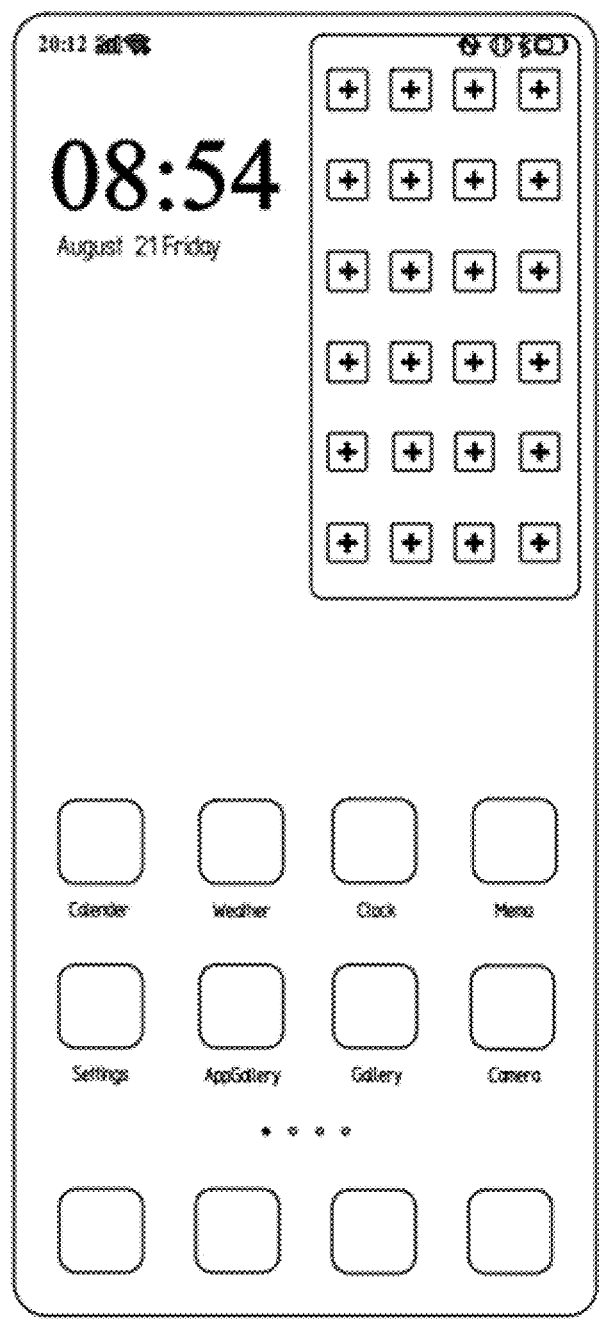
FIG. 6a is a diagram of a floating window always positioned on the top layer of the desktop, according to some embodiments of the present disclosure.
Figure 6B:
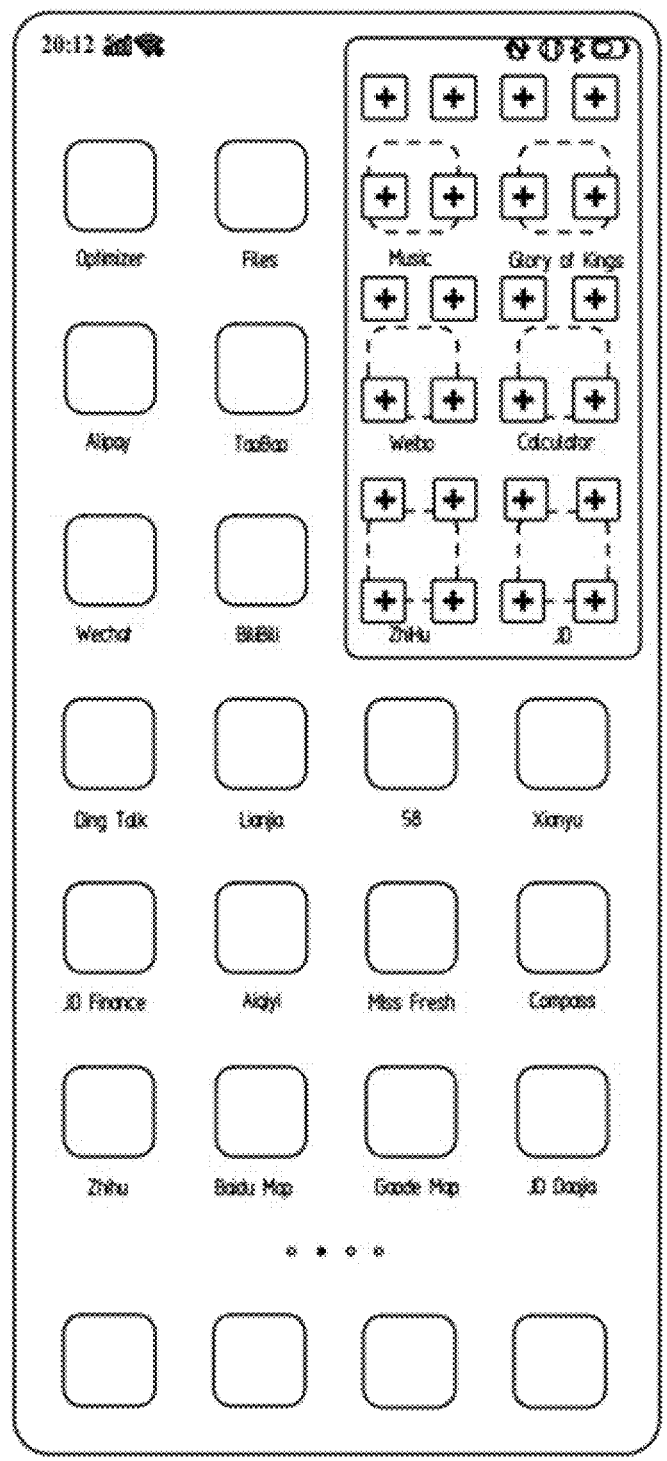
FIG. 6b is a diagram of a floating window always positioned on the top level of the desktop, according to some embodiments of the present disclosure.
Figure 6C:
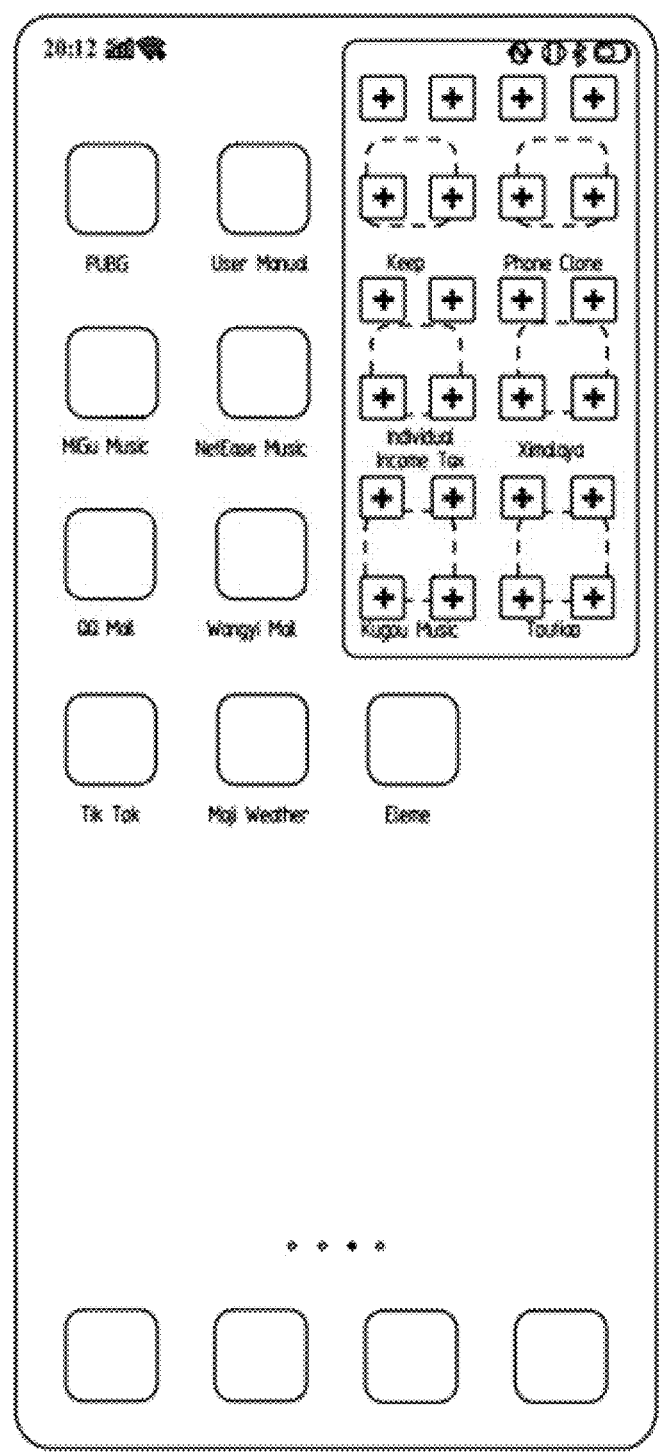
FIG. 6c is a diagram of a floating window always positioned on the top level of the desktop, in accordance with some embodiments of the present disclosure.

In some embodiments, a fourth control instruction is generated when an operation of controlling switching of multiple desktops by a user is detected, switching of multiple different desktops can be achieved, and in some embodiments of the disclosure, as shown in FIGS. 6a, 6b, and 6c, no matter how the desktops slide left and right for switching, a display position and a display level of the floating window in the touch display screen remain unchanged, that is, the floating window is always positioned on an upper layer of the desktop, and an application icon in each desktop can be dragged from an initial display position to a target display position of the floating window.

In some embodiments, the method further includes: responding to a fifth control instruction, adjusting the floating window from the default display position to the target display position.

Figure 7A:
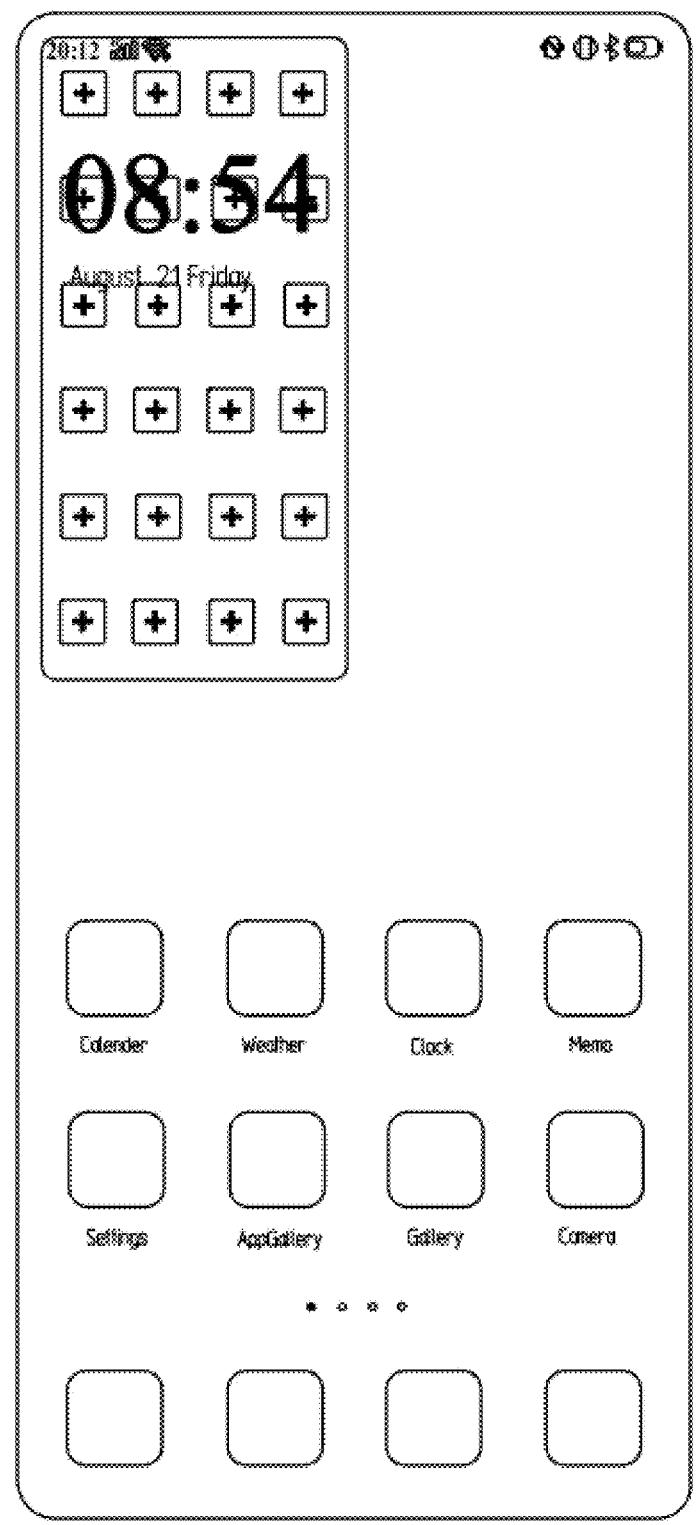
FIG. 7a is a schematic view of a scenario in which the position of the floating window is moved according to user instruction according to some embodiments of the present disclosure.
Figure 7B:
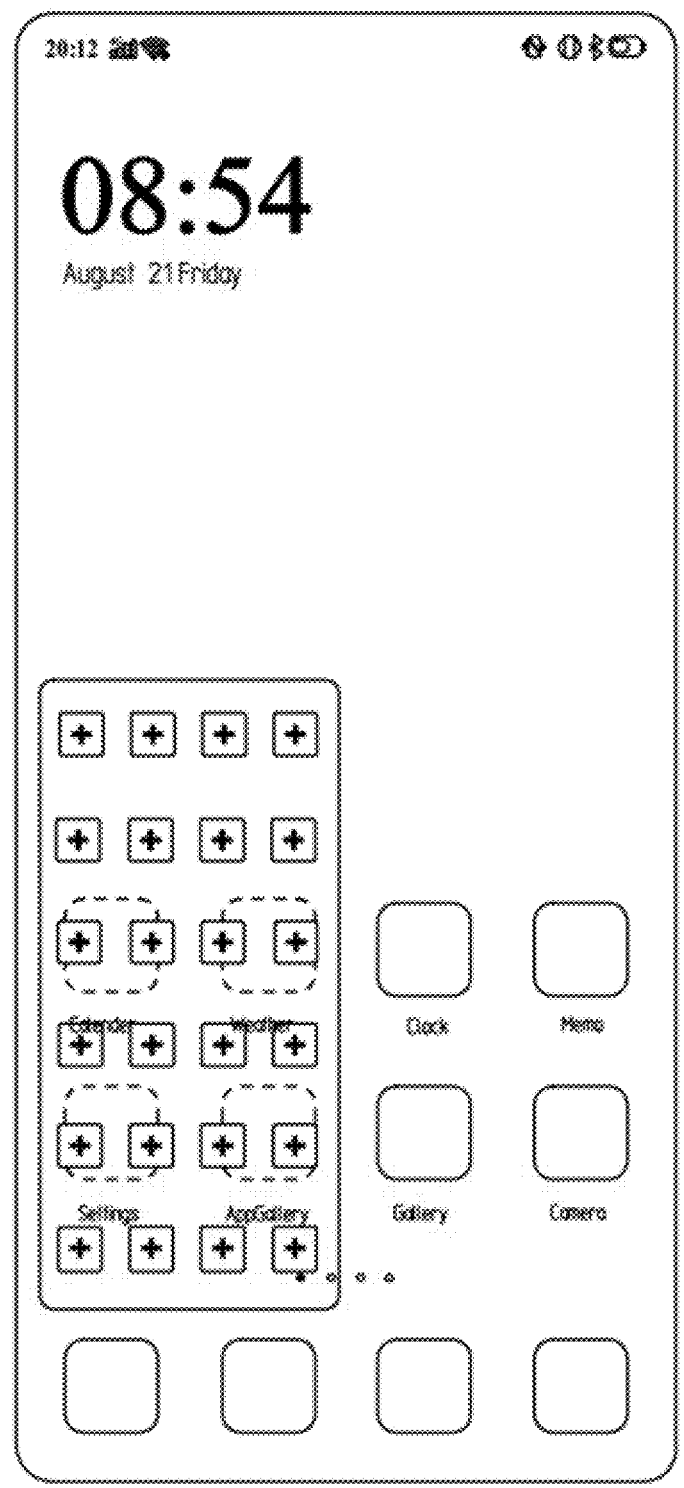
FIG. 7b is a schematic diagram of a scenario in which the position of the floating window is moved according to user instruction according to some embodiments of the present disclosure.
Figure 7C:
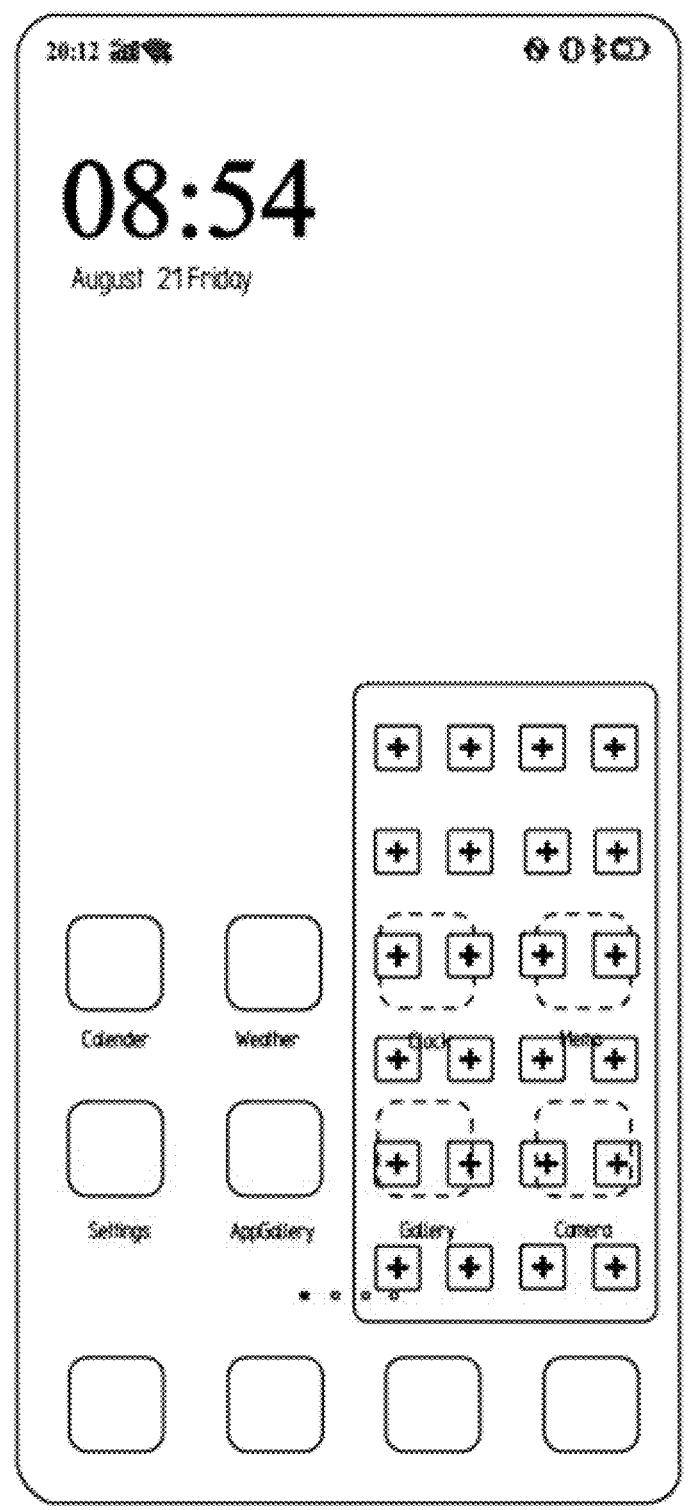
FIG. 7c is a schematic diagram of a scenario in which the position of the floating window is moved according to user instruction according to some embodiments of the present disclosure.

In some embodiments, a fifth control instruction is generated when an operation that the user adjusts the floating window from the default display position to the target display position is detected, in some embodiments, as shown in FIGS. 7a, 7b, and 7c, the position of the floating window may be moved according to a user instruction, for example, when an application icon that the user needs to manipulate is occluded by the floating window, the user may drag the floating window to change the position of the application icon, drag the floating window to a suitable target display position, and then the user may continue to manipulate at least one application icon covered by the floating window to move from the initial display position to the target display position on the floating window.

In some embodiments, the method further includes: in response to a sixth control command, adjusting the display size of the floating window.

In some embodiments, the sixth control instruction may be generated according to an operation of dragging the floating window by the user; in a depth direction of the touch display screen of the mobile terminal, a depth value corresponding to the first display level is smaller than a depth value of the second display level.

In some embodiments, a schematic description is given of a method for generating a desktop of a mobile terminal provided in an embodiment of the disclosure, where the method for generating a desktop of a mobile terminal includes: responding to a first control instruction, and generating a floating window, wherein the floating window is positioned at a first display level, the floating window is used for previewing the target application icon layout; responding to a second control instruction, moving at least one application icon of at least one desktop from an initial display position to a target display position on the floating window, wherein the at least one desktop is positioned at a second display level; and responding to a third control instruction, and generating a target desktop according to the target application icon layout.

In addition, in some embodiments of the present disclosure, the method further includes: responding to a fourth control instruction, and switching among the plurality of desktops; and the display position and the display level of the floating window in the touch display screen are kept unchanged.

In addition, in some embodiments of the present disclosure, the method further includes: responding to a fifth control instruction, and adjusting the floating window from the default display position to the target display position.

In some embodiments of the present disclosure, the method further includes: responding to a sixth control instruction, and adjusting the display size of the floating window.

In some embodiments, the method further includes: deleting the at least one application icon from the target display position on the floating window; or moving the at least one application icon from the target display position on the floating window to any desktop positioned at the second display level.

In some embodiments, after moving at least one application icon of at least one desktop from the initial display position to the target display position on the floating window, a reverse operation is performed on the at least one application icon. For example, if the application icon selected by the user is wrong, another application icon is reselected, or the user no longer desires to customize the application icons in the layout desktop, the at least one application icon may be deleted from the target display position on the floating window, or the at least one application icon is moved from the target display position on the floating window to any desktop positioned in the second display hierarchy. Deleting the at least one application icon from the target display location on the floating window in response to a seventh control instruction. Moving the at least one application icon from the target display location on the floating window into any desktop positioned at the second display level in response to a eighth control instruction.

Figure 8:
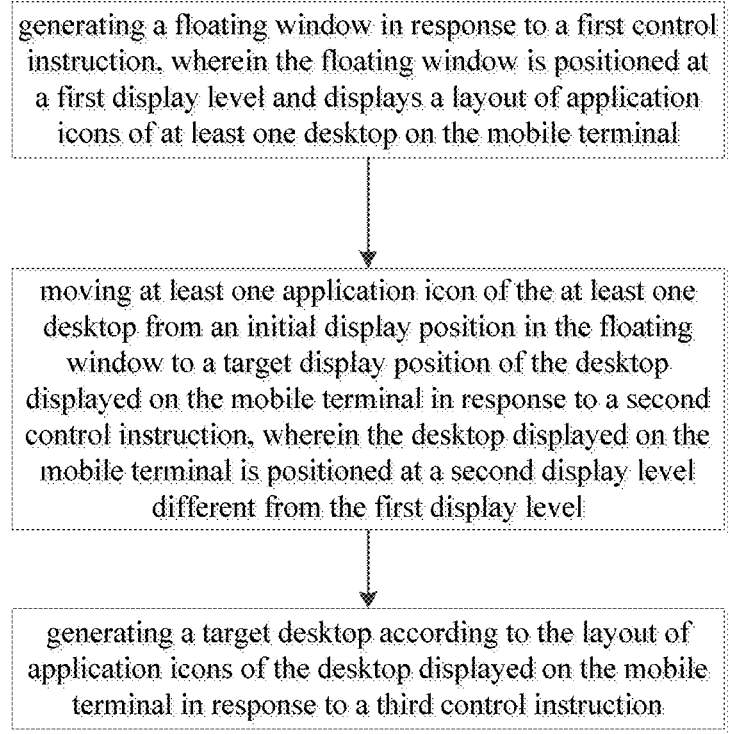
FIG. 8 is a flow chart of a method of generating a desktop for a mobile terminal according to some embodiments of the present disclosure.

There is also provided, in accordance with some embodiments of the present disclosure, a method for generating a desktop for a mobile terminal, including the steps illustrated in the flowchart of, for example, FIG. 1 or FIG. 8 as being executable on a computer system, such as a set of computer-executable instructions, and although a logical order is illustrated in the flowchart, in some cases the steps illustrated or described may be executed in an order different than that presented herein.

FIG. 8 is a flowchart of another method for generating a desktop of a mobile terminal according to an embodiment of the present disclosure, as shown in FIG. 8, the method includes the step S802 to step S806.

In step S802, responding to a first control instruction, and generating a floating window, wherein the floating window is positioned at a first display level and is used for displaying the layout of application icons of at least one desktop on the mobile terminal;

In step S804, in response to a second control instruction, moving at least one application icon of the at least one desktop from an initial display position in the floating window to a target display position of the desktop displayed on the mobile terminal, where the desktop displayed on the mobile terminal is positioned at a second display level;

In step S806, responding to a third control instruction, and generating a target desktop according to the application icon layout of the desktop displayed on the mobile terminal.

In some embodiments of the disclosure, a floating window is generated by responding to a first control instruction, wherein the floating window is positioned at a first display level and is used for displaying the layout of application icons of at least one desktop on a mobile terminal; responding to a second control instruction, and moving at least one application icon of the at least one desktop from an initial display position in the floating window to a target display position of the desktop displayed on the mobile terminal, wherein the desktop displayed on the mobile terminal is positioned at a second display level; responding to the third control instruction, generating a target desktop according to the layout of the application icons of the desktop displayed on the mobile terminal. The above steps help to achieve improving the processing efficiency and accuracy of generating the desktop of the mobile terminal, thereby realizing a technical effect of quickly and conveniently self-defining the application icons in the desktop in a layout manner, and further helping to solve the technical problems of lower processing efficiency and accuracy when the desktop of the mobile terminal is generated.

In some embodiments, the mobile terminal may be a terminal device such as a smart phone, an iPAD, a smart watch, and the like, and the display screen of the mobile terminal is a touch display screen. The floating window is positioned at a first display level, the at least one desktop is positioned at a second display level, and the first display level is higher than the second display level; the floating window is a window control for previewing the layout of the target application icons, and is substantially a preview window of an updated target desktop, and is used for displaying the layout of the application icons of at least one desktop on the mobile terminal.

In some embodiments of the present application, by providing some embodiments of a method for generating a desktop of a mobile terminal, a new operation mode can be provided for a user when performing custom layout arrangement on at least one application icon in the desktop of the mobile terminal. When a user desires to perform layout rearrangement on at least one application icon of at least one desktop, a first control instruction is generated when the operation that the user clicks or touches a touch display screen of the mobile terminal is detected, a floating window for previewing the layout of a target application icon appears in the desktop of the mobile terminal, the at least one application icon of the at least one desktop is moved from an initial display position in the floating window to a target display position of the desktop displayed on the mobile terminal at a second display level in response to a second control instruction, and then a third control instruction is received, and the target desktop is generated according to the layout of the target application icon.

Through some embodiments of the disclosure, the user can quickly and conveniently carry out the custom layout on the application icons in the desktop, when the application icons in the desktop cross a plurality of desktops for layout arrangement, some embodiments of the disclosure can also easily realize the custom layout on the application icons in the desktop, so that the user can reduce the learning cost and the operation burden when carrying out the desktop application arrangement, and the purpose of fast and conveniently carrying out the custom layout arrangement on the application icons in the desktop is achieved.

In some embodiments, the schematic layout of the desktop when the application icon is not sorted is shown in FIG. 2a, FIG. 2b, and FIG. 2c, for example, FIG. 2a may be a current desktop, FIG. 2b is a desktop slid from the current desktop to the left, and FIG. 2c is a desktop slid from the current desktop to the right.

As shown in FIG. 3, a first control instruction is generated according to a touch operation of a user clicking and dragging one or more application icons, the one or more application icons are laid out, and a floating window (preview floating window) appears on an upper layer of a desktop main interface, for example, the floating window is generated at an upper right corner of the desktop by default.

In some embodiments, the second control instruction is generated according to the operation that the user moves the at least one application icon from the initial display position to the target display position is detected, and the third control instruction is generated according to the operation that the user ceases contact, e.g., removes a finger, with the touch display screen after moving the at least one application icon from the initial display position to the target display position is detected.

In some embodiments, a default layout manner of a target display position of a desktop displayed on the mobile terminal is the same as a layout manner of any desktop in the at least one desktop, and a display size of the floating window is scaled down according to a display size of the desktop displayed on the mobile terminal.

In some embodiments, a default layout manner of a target display position of a desktop displayed on the mobile terminal is the same as a layout manner of any desktop in a plurality of candidate desktops preset in the mobile terminal, and a display size of the floating window is scaled down in equal proportion to a display size of the desktop displayed on the mobile terminal.

In some embodiments, a default layout manner of a target display position of a desktop displayed on the mobile terminal is the same as a layout manner of a user-defined desktop, and a display size of the floating window is scaled down in equal proportion to the display size of the desktop displayed on the mobile terminal.

In some embodiments, in the depth direction of the touch display screen of the mobile terminal, the depth value corresponding to the first display level is smaller than the depth value of the second display level.

For example, in some embodiments, the display size of the floating window is scaled down according to the display size of any desktop in the at least one desktop, which may be scaled down to about ⅓, and the default layout manner of the target display positions on the floating window is the same as the current layout manner of the initial display positions on each desktop in the at least one desktop. That is, the target display positions are laid out in the floating window according to the current layout manner of the initial display positions on each desktop. For example, in some embodiments, if the current layout manner of the initial display positions on each desktop is 4×x5, the default layout manner of the target display positions on the floating window may also be 4×x 5.

In some embodiments, the method further includes: deleting the at least one application icon from a target display position of a desktop displayed on the mobile terminal; or moving the at least one application icon from the target display position of the desktop displayed on the mobile terminal to the floating window.

In some embodiments, after moving the at least one application icon of the at least one desktop from the initial display position in the floating window to the target display position of the desktop displayed on the mobile terminal, a reverse operation is performed on the at least one desktop. For example, if the application icon selected by the user is wrong, another application icon is able to be reselected, or the user no longer desires to customize the application icons in the layout desktop, the at least one application icon may be deleted from the target display position of the desktop displayed on the mobile terminal, or the at least one application icon may be moved from the target display position of the desktop displayed on the mobile terminal to the floating window. Deleting the at least one application icon from the target display location on the floating window in response to a seventh control instruction. Moving the at least one application icon from the target display location on the floating window into any desktop positioned at the second display level in response to an eighth control instruction.

Figure 9:
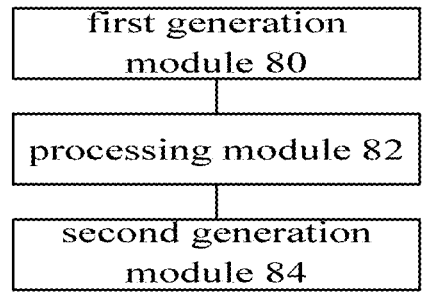
FIG. 9 is a schematic structural diagram of a device for generating a desktop of a mobile terminal according to some embodiments of the present disclosure.

According to some embodiments of the present disclosure, an device embodiment for implementing the method for generating a desktop of a mobile terminal is further provided, FIG. 9 is a schematic structural diagram of an device for generating a desktop of a mobile terminal according to some embodiments of the present disclosure, and as shown in FIG. 9, the device for generating a desktop of a mobile terminal includes: a first generation module 80, a processing module 82, and a second generation module 84.

The system comprises a first generation module, a second generation module and a display module, wherein the first generation module is used for responding to a first control instruction and generating a floating window, the floating window is positioned at a first display level, and the floating window is used for previewing the layout of target application icons; a processing module, configured to respond to a second control instruction, move at least one application icon of at least one desktop from an initial display position to a target display position on the floating window, where the at least one desktop is at a second display level, and the first display level is higher than the second display level; and the second generation module is used for responding to a third control instruction and generating a target desktop according to the target application icon layout.

One of ordinary skill in the art would understand that the above modules may be implemented by software or hardware, for example, for the latter, the following may be implemented: the modules can be positioned in the same processor. Alternatively, the modules may be positioned in different processors in any combination.

One of ordinary skill in the art would understand that the first generating module 80, the processing module 82 and the second generating module 84 correspond to steps S102 to S106, and the modules are the same as the corresponding steps in implementation examples and application scenarios, but are not limited to the disclosure. One of ordinary skill in the art would understand that the modules described above may be implemented in a computer terminal as part of a device.

Figure 10:
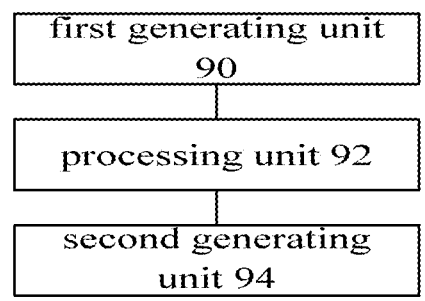
FIG. 10 is a schematic structural diagram of a device for generating a desktop of a mobile terminal according to some embodiments of the present disclosure.

According to some embodiments of the present disclosure, another device for implementing the method for generating a desktop of a mobile terminal is further provided, FIG. 10 is a schematic structural diagram of a device for generating a desktop of a mobile terminal according to some embodiments of the present disclosure, and as shown in FIG. 10, the device for generating a desktop of a mobile terminal includes: a first generating unit 90, a processing unit 92 and a second generating unit 94.

A first generating unit 90 is configured to generate a floating window in response to a first control instruction, where the floating window is positioned at a first display level and is used to display an application icon layout of at least one desktop on the mobile terminal.

A processing unit 92 is configured to respond to a second control instruction, move at least one application icon of the at least one desktop from an initial display position in the floating window to a target display position of a desktop displayed on the mobile terminal, where the desktop displayed on the mobile terminal is positioned at a second display level.

The second generating unit 90 is configured to respond to a third control instruction, and generate a target desktop according to the layout of the application icons of the desktop displayed on the mobile terminal.

One of ordinary skill in the art would understand that the first generating unit 90, the processing unit 92 and the second generating unit 94 correspond to steps S802 to S806 in FIG. 8, and the modules are the same as the corresponding steps in implementation example and application scenarios, but are not limited to the disclosure in FIG. 8. One of ordinary skill in the art would understand that the modules described above may be implemented in a computer terminal as part of a device.

One of ordinary skill in the art would understand that, reference may be made to the relevant description in FIG. 8 for alternative embodiments, and details are not described here again.

The above device for generating a desktop of a mobile terminal may further include a processor and a memory, where the above first generation module 80, the processing module 82, the second generation module 84, the first generation unit 90, the processing unit 92, the second generation unit 94, and the like are all stored in the memory as program units, and the processor executes the above program units stored in the memory to implement corresponding functions.

The processor comprises a kernel, and the kernel calls a corresponding program unit from the memory, wherein one or more than one kernel can be arranged. The memory may include volatile memory in a computer readable medium, Random Access Memory (RAM) and/or nonvolatile memory such as Read Only Memory (ROM) or flash memory (flash RAM), and the memory includes at least one memory chip.

According to some embodiments of the disclosure, a nonvolatile storage medium is also provided. In some embodiments, the nonvolatile storage medium includes a stored program, and the device where the nonvolatile storage medium is located is controlled to execute any one of the above methods for generating a desktop of a mobile terminal when the program runs.

In some embodiments, the nonvolatile storage medium may be located in any one of a group of computer terminals in a computer network, or in any one of a group of mobile terminals, and the nonvolatile storage medium includes a stored program.

In some embodiments, the device in which the non-volatile storage medium is controlled to perform the following functions when the program is executed: responding to a first control instruction, and generating a floating window, wherein the floating window is positioned at a first display level and is used for previewing the layout of the target application icons; responding to a second control instruction, and moving at least one application icon of at least one desktop from an initial display position to a target display position on the floating window, wherein the at least one desktop is positioned at a second display level; and responding to a third control instruction, and generating a target desktop according to the target application icon layout.

In some embodiments, the device in which the non-volatile storage medium is controlled to perform the following functions when the program is executed: and moving a plurality of application icons currently displayed on the same desktop from the initial display position to a target display position on the floating window.

In some embodiments, the device in which the non-volatile storage medium is controlled to perform the following functions when the program is executed: and moving at least one application icon currently displayed on each desktop in the plurality of desktops from the initial display position to a target display position on the floating window.

In some embodiments, the device in which the non-volatile storage medium is controlled to perform the following functions when the program is executed: and responding to a fourth control instruction, switching among the desktops, and keeping the display position and the display level of the floating window in the touch display screen of the mobile terminal unchanged.

In some embodiments, the device in which the non-volatile storage medium is controlled to perform the following functions when the program is executed: and responding to a fifth control instruction, and adjusting the floating window from the default display position to the target display position.

In some embodiments, the device in which the non-volatile storage medium is controlled to perform the following functions when the program is executed: and responding to a sixth control instruction, and adjusting the display size of the floating window.

In some embodiments, the device in which the non-volatile storage medium is controlled to perform the following functions when the program is executed: responding to a first control instruction, and generating a floating window, wherein the floating window is positioned at a first display level and is used for displaying the layout of application icons of at least one desktop on the mobile terminal; responding to a second control instruction, and moving at least one application icon of the at least one desktop from an initial display position in the floating window to a target display position of the desktop displayed on the mobile terminal, wherein the desktop displayed on the mobile terminal is located at a second display level; and responding to a third control instruction, and generating a target desktop according to the application icon layout of the desktop displayed on the mobile terminal.

According to some embodiments of the disclosure, a processor is also provided. In some embodiments, the processor is configured to execute a program, where the program executes any one of the above methods for generating a desktop of a mobile terminal.

Some embodiments of the present application provides an electronic device, which includes a memory and a processor, where the memory stores a computer program, and the processor is configured to run the computer program to execute any one of the above methods for generating a desktop of a mobile terminal.

The present application also provides a computer program product adapted to perform a program initialized with any of the above method steps of generating a desktop for a mobile terminal when executed on a data processing device.

The above-mentioned reference numbers of the described embodiments of the present disclosure are merely for description and do not represent the limits of the embodiments.

In some embodiments of the present disclosure, the descriptions of the respective embodiments have respective emphasis, and for parts that are not described in detail in a certain embodiment, reference may be made to related descriptions of other embodiments.

In some embodiments provided in the present disclosure, one of ordinary skill in the art would understand that the disclosed technology can be implemented in other ways. The above-described embodiments of the device are merely illustrative, and for example, the above-described division of the units may be a logical division, and in actual implementation, there may be another division, for example, multiple units or components may be combined or may be integrated into another system, or some features may be omitted, or not executed. In addition, the shown or discussed mutual coupling or direct coupling or communication connection may be an indirect coupling or communication connection through some interfaces, units or modules, and may be in an electrical or other form.

The units described as separate parts may or may not be physically separate, and parts displayed as units may or may not be physical units, may be located in one place, or may be distributed on a plurality of units. Some or all of the units can be selected according to actual needs to achieve the purpose of the solution of described embodiments.

In addition, functional units in some embodiments of the present disclosure may be integrated into one processing unit, or each unit may exist alone physically, or two or more units are integrated into one unit. The integrated unit can be realized in a form of hardware, and can also be realized in a form of a software functional unit.

The integrated unit may be stored in a computer-readable storage medium if it is implemented in the form of a software functional unit and sold or used as a separate product. Based on such understanding, the technical solution of the present disclosure may be embodied in the form of a software product, which is stored in a storage medium and includes instructions for causing a computer device (which may be a personal computer, a server, or a network device) to execute all or part of the steps of the above methods according to the embodiments of the present disclosure. And the aforementioned storage medium includes: a U-disk, a Read-Only Memory (ROM), a Random Access Memory (RAM), a removable hard disk, a magnetic or optical disk, and other various media capable of storing program codes.

The foregoing is only some embodiments of the present disclosure, and one of ordinary skill in the art would understand that, for those skilled in the art, various modifications and decorations can be made without departing from the principle of the present disclosure, and these modifications and decorations should also be regarded as the protection scope of the present disclosure

What is claimed is:

1. A method for generating a desktop of a mobile terminal, comprising:

generating a floating window in response to a first control instruction, wherein the floating window is positioned at a first display level, and the floating window includes a preview of a layout of target application icons, and the layout of target application icons comprises a plurality of target display positions;

moving at least one application icon of at least one desktop from an initial display position to a target display position of the plurality of target display positions on the floating window in response to a second control instruction, wherein the at least one desktop is positioned at a second display level different from the first display level, and any of the at least one application icon overlapped by the floating window is displayed as having a dashed box outline on the second display level, and a name of each of the at least one application icon on the second display level is visible through the floating window, generating a target desktop according to the layout of the target application icons in response to a third control instruction;

wherein in response to generating the floating window, a size of at least one desktop does not change, wherein the initial display position and the target display position are highlighted with a shading prior to the moving of the at least one application icon of the at least one desktop, and wherein the first control instruction comprises clicking and dragging the at least one application icon of the at least one desktop.

2. The method of claim 1, wherein a default layout of the plurality of target display positions on the floating window is the same as a layout of a first desktop in the at least one desktop, and a display size of the floating window is scaled down in equal proportion to a display size of the first desktop in the at least one desktop.

3. The method of claim 1, wherein a default layout manner of the plurality of target display positions on the floating window is the same as a layout manner of a first desktop of a plurality of candidate desktops preset in the mobile terminal, and a display size of the floating window is scaled down in an equal proportion to a display size of the first desktop in the plurality of candidate desktops.

4. The method of claim 1, wherein a default layout of the plurality of target display positions on the floating window is the same as a layout of a user-defined desktop, and a display size of the floating window is scaled down in equal proportion to a display size of the user-defined desktop.

5. The method of claim 1, wherein moving the at least one application icon from the initial display position to the target display position on the floating window comprises: moving a plurality of application icons displayed on the same desktop from initial display positions to target display positions of the plurality of target display positions on the floating window.

6. The method of claim 1, wherein moving the at least one application icon from the initial display position to the target display position on the floating window comprises: moving the at least one application icon displayed by each desktop in a plurality of desktops from the initial display position to the target display position on the floating window.

7. The method of claim 1, further comprising: switching among the at least one desktop in response to a fourth control instruction; and maintaining a display position and display level of the floating window during the switching among the at least one desktop.

8. The method of claim 1, further comprising: adjusting the floating window from a default display position to a target display position in response to a fifth control instruction.

9. The method of claim 1, further comprising: and adjusting a display size of the floating window in response to a sixth control instruction.

10. The method of claim 1, wherein a depth value corresponding to the first display level is less than the depth value of the second display level in a depth direction of a display screen.

11. The method of claim 1, further comprising: deleting the at least one application icon from the target display location on the floating window in response to a seventh control instruction.

12. The method of claim 1, further comprising: moving the at least one application icon from the target display location on the floating window into any desktop positioned at the second display level in response to an eighth control instruction.

13. The method of claim 1, when at least one application icon currently displayed on the at least one desktop is positioned below the floating window, a name of at least one application icon and the at least one application icon is visible through the floating window.

14. The method of claim 1, wherein the third control instruction comprises ceasing contact with the at least one application icon of the at least one desktop, in response to detecting the at least one application icon is moved from the initial display position to the target display position.

15. A non-transitory computer readable medium, wherein a computer program is stored in the non-transitory computer readable medium, wherein the computer program is configured to execute the method for generating a desktop according to claim 1 when running.

16. A processor, wherein the processor is configured to run a program, wherein the program is configured to perform the method of generating a desktop as claimed in claim 1 when running.

17. An electronic device comprising a memory and a processor, wherein the memory stores a computer program, and the processor is configured to execute the computer program to perform the method of as claimed in claim 1.

18. A method for generating a desktop of a mobile terminal, comprising:
generating a floating window in response to a first control instruction, wherein the floating window is positioned at a first display level and displays a layout of application icons of at least one desktop on the mobile terminal;

moving at least one application icon of the at least one desktop from an initial display position in the floating window to a target display position of a desktop displayed on the mobile terminal in response to a second control instruction, wherein the at least one desktop displayed on the mobile terminal is positioned at a second display level different from the first display level, and any of the at least one application icon overlapped by the floating window is displayed as having a dashed box outline on the second display level, and a name of each of the at least one application icon on the second display level is visible through the floating window, generating a target desktop according to the layout of application icons of the at least one desktop displayed on the mobile terminal in response to a third control instruction; and in response to generating the floating window, a size of at least one desktop does not change, wherein the initial display position and the target display position are highlighted with a shading prior to the moving of the at least one application icon of the at least one desktop, wherein the first control instruction comprises clicking and dragging the at least one application icon of the at least one desktop, and wherein the third control instruction comprises ceasing contact with the at least one application icon of the at least one desktop, in response to detecting the at least one application icon is moved from the initial display position to the target display position.

19. The method of claim 18, wherein a default layout of the target display position of the desktop displayed on the mobile terminal is the same as a layout of a first desktop in the at least one desktop, and the display size of the floating window is scaled down in equal proportion to the display size of the first desktop displayed on the mobile terminal.

20. The method according to claim 18, wherein a default layout manner of the target display position of the desktop displayed on the mobile terminal is the same as a layout manner of a first alternative desktop in a plurality of alternative desktops preset in the mobile terminal, and a display size of the floating window is scaled down in equal proportion to a display size of the desktop displayed on the mobile terminal.

21. The method of claim 18, wherein a default layout of the target display position of the desktop displayed on the mobile terminal is the same as a layout of a user-defined desktop, and a display size of the floating window is scaled down in equal proportion to the display size of the desktop displayed on the mobile terminal.

22. The method according to claim 18, wherein a depth value corresponding to the first display level is less than a depth value of the second display level in a depth direction of a display screen of the mobile terminal.

23. The method of claim 18, further comprising deleting the at least one application icon from the target display location on the floating window in response to a seventh control instruction.

24. The method of claim 18, further comprising moving the at least one application icon from the target display location on the floating window into any desktop positioned at the second display level in response to an eighth control instruction.

25. The method of claim 18, further comprising:

deleting the at least one application icon from the target display position of a desktop displayed on the mobile terminal; or moving the at least one application icon from the target display position of the desktop displayed on the mobile terminal to the floating window.

26. A device for generating a desktop of a mobile terminal, comprising:

a non-transitory computer readable medium configured to store instructions thereon; and a processor connected to the non-transitory computer readable medium, wherein the processor is configured to execute the instructions for:

generating a floating window in response to a first control instruction, wherein the floating window is positioned at a first display level and previews a layout of target application icons;

moving at least one application icon of at least one desktop from an initial display position to a target display position on the floating window in response to a second control instruction, wherein the at least one desktop is positioned at a second display level, and the first display level is higher than the second display level, and any of the at least one application icon overlapped by the floating window is displayed as having a dashed box outline on the second display level, and a name of each of the at least one application icon on the second display level is visible through the floating window, and generating a target desktop according to the layout of target application icons in response to a third control instruction;

wherein in response to generating the floating window the second control instruction, a size of at least one desktop does not change, wherein the initial display position and the target display position are highlighted with a shading prior to the moving of the at least one application icon of the at least one desktop, and wherein the first control instruction comprises clicking and dragging the at least one application icon of the at least one desktop.

27. The device of claim 26, wherein the third control instruction comprises ceasing contact with the at least one application icon of the at least one desktop, in response to detecting the at least one application icon is moved from the initial display position to the target display position.

28. A device for generating a desktop of a mobile terminal, comprising:

a non-transitory computer readable medium configured to store instructions; and a processor connected to the non-transitory computer readable medium, wherein the processor is configured to execute the instructions for:

generating a floating window in response to a first control instruction, wherein the floating window is positioned at a first display level and displays a layout of application icons of at least one desktop on the mobile terminal;

moving at least one application icon of the at least one desktop from an initial display position in the floating window to a target display position of a desktop displayed on the mobile terminal in response to a second control instruction, wherein the desktop displayed on the mobile terminal is located at a second display level different from the first display level, and any of the at least one application icon overlapped by the floating window is displayed as having a dashed box outline on the second display level, and a name of each of the at least one application icon on the second display level is visible through the floating window, and generating a target desktop according to the layout of application icons of the at least one desktop displayed on the mobile terminal in response to a third control instruction; and in response to generating the floating window the second control instruction, a size of at least one desktop does not change, wherein the initial display position and the target display position are highlighted with a shading prior to the moving of the at least one application icon of the at least one desktop wherein the first control instruction comprises clicking and dragging the at least one application icon of the at least one desktop, and wherein the third control instruction comprises ceasing contact with the at least one application icon of the at least one desktop, in response to detecting the at least one application icon is moved from the initial display position to the target display position.

\* \* \* \* \*